(12) United States Patent
Young

(10) Patent No.: US 6,365,296 B1
(45) Date of Patent: Apr. 2, 2002

(54) CONVECTIVE AIR MANAGER FOR METAL-AIR BATTERY

(75) Inventor: Jeffrey E. Young, Peachtree City, GA (US)

(73) Assignee: AER Energy Resources, Inc., Smyrna, GA (US)

( * ) Notice: Subject to any disclaimer, the term of this patent is extended or adjusted under 35 U.S.C. 154(b) by 0 days.

(21) Appl. No.: 09/346,405

(22) Filed: Jul. 1, 1999

(51) Int. Cl.[7] .............................. H01M 2/12; H01M 2/36
(52) U.S. Cl. ............................... 429/82; 429/72; 429/83
(58) Field of Search ............................. 429/72, 82, 83, 429/26, 27

(56) References Cited

U.S. PATENT DOCUMENTS

| | | | |
|---|---|---|---|
| 3,632,449 A | 1/1972 | Yardney et al. | 429/13 |
| 3,871,920 A | 3/1975 | Grebier et al. | 429/27 |
| 5,215,834 A | 6/1993 | Reher et al. | 429/62 |
| 5,385,793 A * | 1/1995 | Tiedemann et al. | 429/62 |
| 5,571,630 A * | 11/1996 | Cheiky | 429/26 |
| 5,603,656 A * | 2/1997 | Baer et al. | 454/339 |
| 5,691,074 A | 11/1997 | Pedicini | 429/27 |
| 5,721,064 A | 2/1998 | Pedicini et al. | 429/27 |
| 5,753,384 A * | 5/1998 | Kimberg | 429/27 |

FOREIGN PATENT DOCUMENTS

| | | |
|---|---|---|
| EP | 0 044 060 | 7/1981 |
| JP | 50-40773 | 12/1975 |

OTHER PUBLICATIONS

"Thermal Management of the Iron–Air Battery, System," Demczyk et al., Westinghouse Research and Development Center, 1046B Extended Abstracts, vol. 81–2 (1981) Oct. Pennington, New Jersey.

* cited by examiner

Primary Examiner—Stephen Kalafut
Assistant Examiner—Julian A. Mercado
(74) Attorney, Agent, or Firm—Alston & Bird LLP

(57) ABSTRACT

An orientation independent metal-air power source utilizing convective airflow for enhancing power output for powering a load. A battery housing for enclosing at least one metal-air cell has an air cavity at each end. Between the two cavities is an elongated central passageway. The cavities are preferably disk-shaped and include a circular resistance element in their outer periphery. A central gravity switch with a conductive ball and a plurality of contact pairs is coupled to the resistance elements. Each of the contact pairs is associated with a particular angular orientation of the metal-air battery. At least a portion of one of the resistance elements is heated when the ball comes into contact with one of the contact pairs. A plurality of isolating passageways pass sufficient airflow to the oxygen electrode, while the resistance element portion is heated, and restricts airflow to the oxygen electrode when the resistance element portion is not heated. The convective airflow is permitted to rise through the housing and across the oxygen electrode of the metal-air battery regardless of the angular orientation of the metal-air battery.

42 Claims, 5 Drawing Sheets

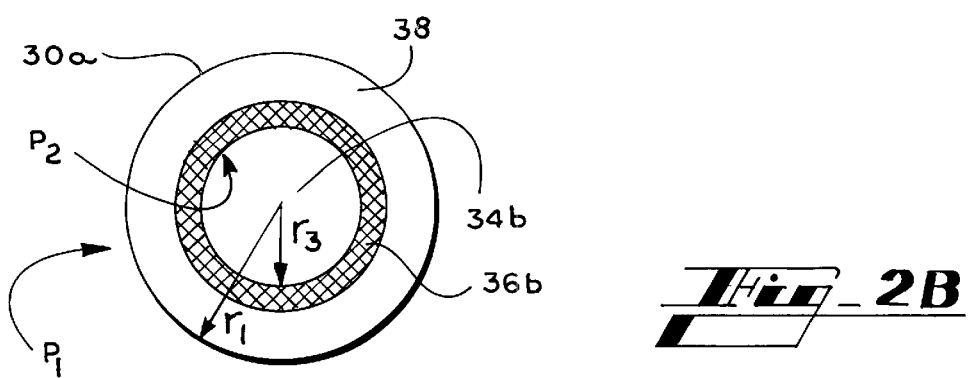
Fig_2B
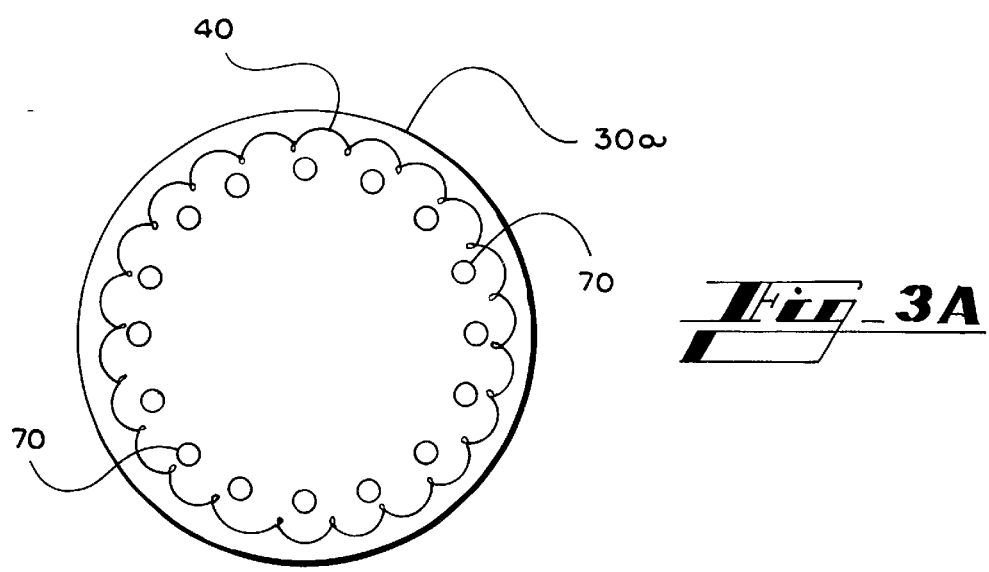
Fig_3A
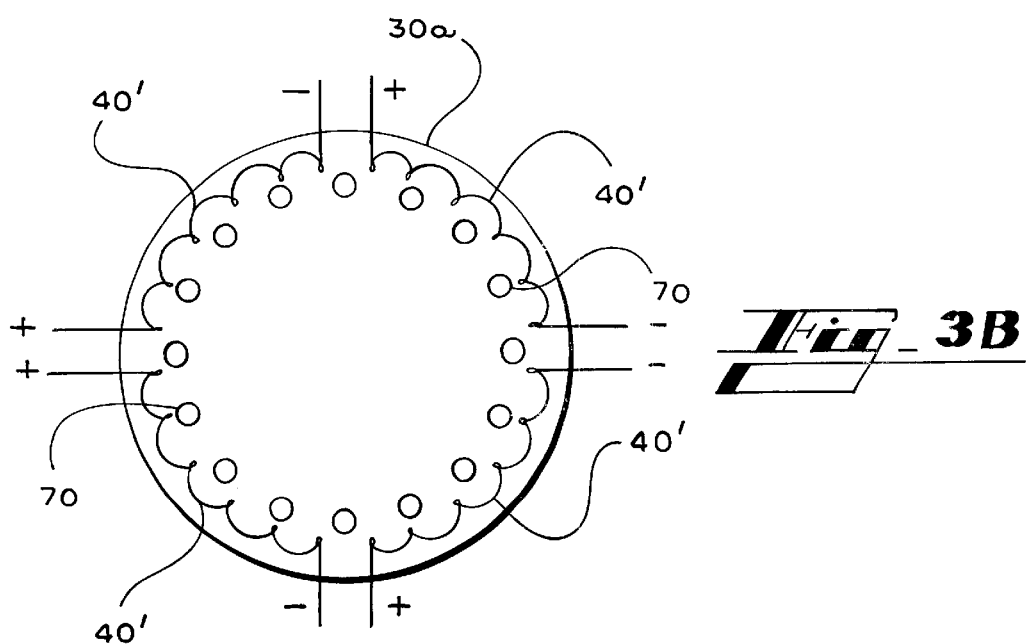
Fig_3B

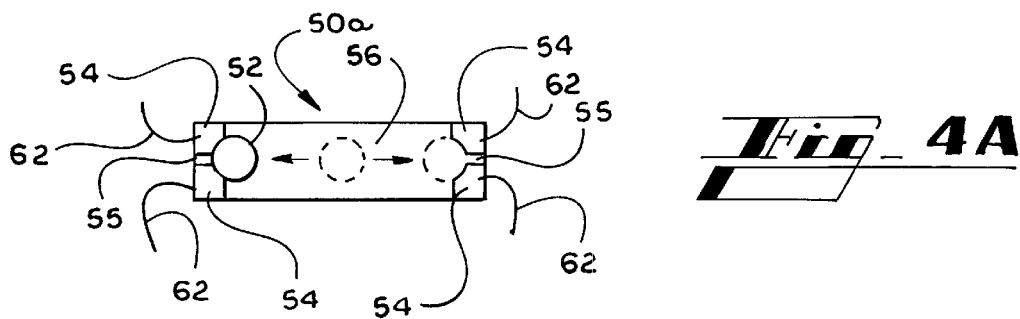
Fig_4A
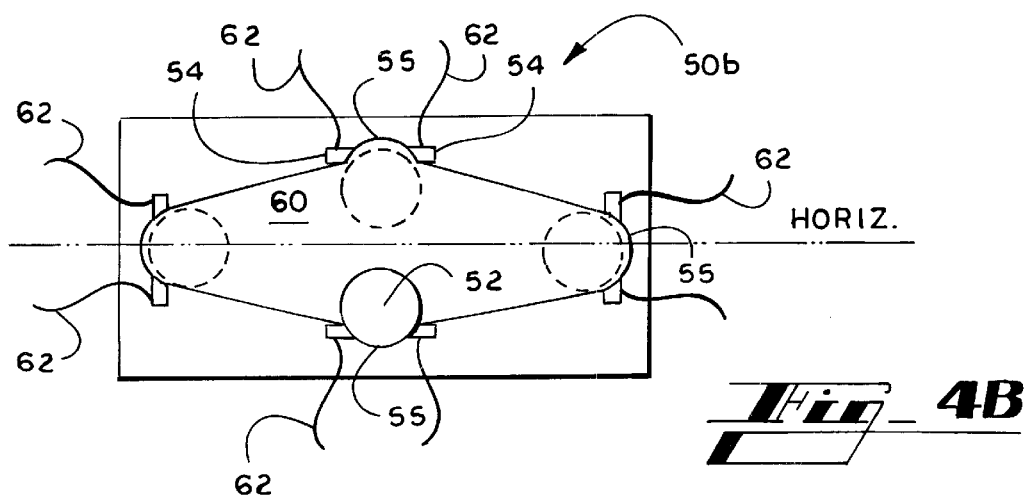
Fig_4B
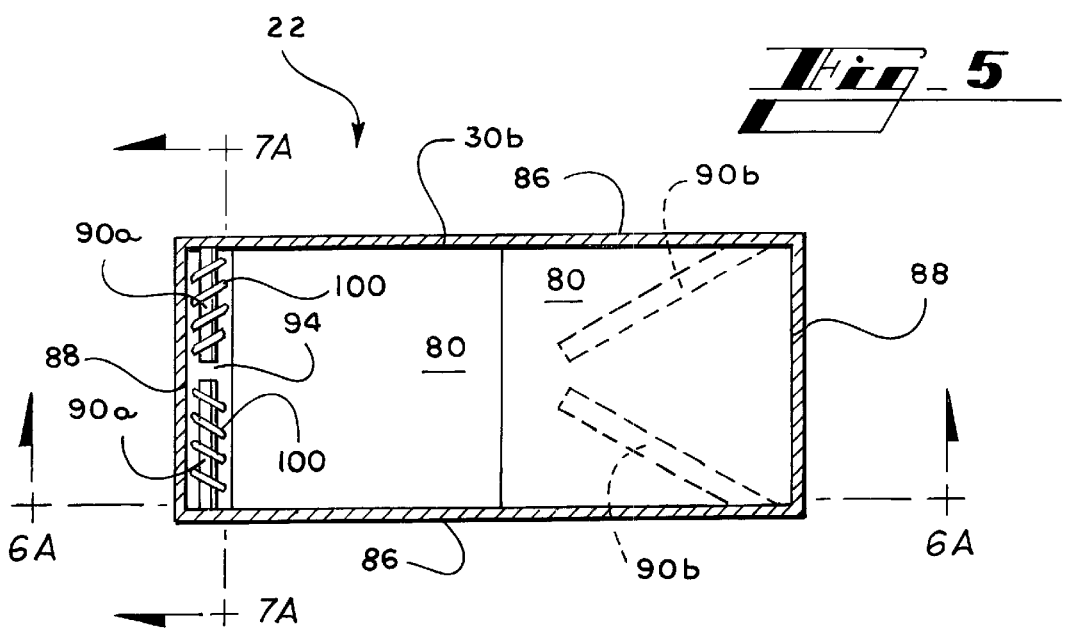
Fig_5

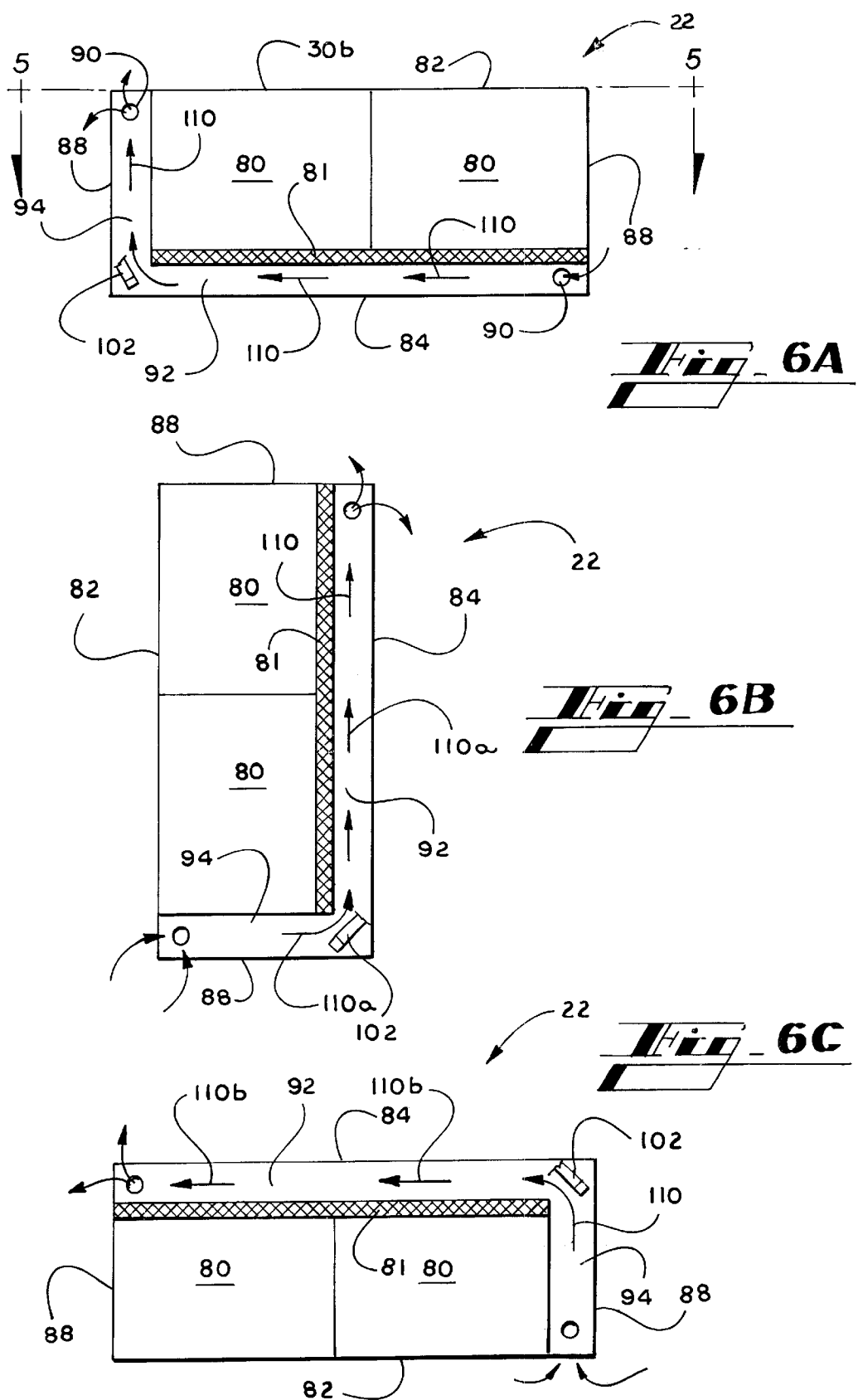

CONVECTIVE AIR MANAGER FOR METAL-AIR BATTERY

FIELD OF THE INVENTION

The present invention relates to metal-air cells. This invention more particularly pertains to facilitating heat-driven convective airflow in metal-air cells that incorporate air manager technology.

BACKGROUND OF THE INVENTION

Metal-air cells have been recognized as a desirable means for powering portable electronic equipment, such as personal computers, camcorders and telephones, because such battery cells have a relatively high power output with relatively low weight as compared to other types of electrochemical battery cells. Metal-air batteries include an air permeable cathode, commonly referred to as an oxygen electrode, and a metallic anode separated by an electrolyte. Electrical energy is created with a metal-air battery by an electrochemical reaction.

Metal-air battery cells utilize oxygen from the ambient air as a reactant in the electrochemical process. During discharge of a metal-air battery, such as a zinc-air battery, oxygen from the ambient air is converted at the oxygen electrode to hydroxide, zinc is oxidized at the anode by the hydroxide, and water and electrons are released to provide electrical energy. Metal-air cells utilize oxygen from the ambient air as a reactant, rather than utilizing a heavier material, such as a metal or metallic composition. To operate a metal-air battery, it is therefore necessary to provide a supply of oxygen to the oxygen electrode of the battery.

To preserve the efficiency, power and lifetime of a metal-air cell, it is desirable to effectively isolate the oxygen electrodes and anode of the metal-air cell from the ambient air while the cell is not operating. There are ventilation systems designed to provide the dual functions of providing air to a metal-air cell for power output and isolating the cells during non-use. These known ventilation systems are referred to as air managers. Some air managers only provide air doors that open when power is drawn from the cells and close to attempt to seal the cell housing when the cells are not in use. An important component of successful air managers has been an air mover, such as a fan or an air pump. However, such air movers used in metal-air batteries have been bulky and expensive relative to the volume and cost of the metal-air cells.

While a key advantage of metal-air cells is their high energy density resulting from the low weight of the oxygen electrode, this advantage is compromised by the space and weight required by an effective air mover. Space that could otherwise be used for battery chemistry to prolong the life of the battery must be used to accommodate an air mover. This loss of space can be critical to attempts to provide a practical metal-air cell in small enclosures such as the "AA" cylindrical size now used as a standard in many electronic devices. Also, the air mover uses up energy stored in the cells.

U.S. Pat. No. 5,691,074 to Pedicini, entitled "DIFFUSION CONTROLLED AIR VENT FOR A METAL-AIR BATTERY", the entire disclosure of which is incorporated herein by reference, discloses systems for controlling the isolation of one or more metal-air cells from the ambient air while the cells are not operating. In accordance with one example disclosed by Pedicini, a group of metal-air cells are isolated from the ambient air, except for an inlet passageway and an outlet passageway. These passageways may be, for example, elongate tubes. An air moving device circulates air across the oxygen electrodes and forces air through the inlet and outlet passageways to refresh the circulating air with ambient air, so that oxygen is supplied to the oxygen electrodes. The passageways are sized to (i) pass sufficient airflow while the air moving device is operating to enable the metal-air cells to provided an output current for powering a load, but (ii) restrict airflow while the passageways are unsealed and no air is forced therethrough by the air moving device, so that a limited amount of air diffuses through the passageways.

When the air mover is off and the humidity level within the cell is relatively constant, only a very limited amount of air diffuses through the passageways. The water vapor within the cell protects the oxygen electrodes from oxygen exposure. The oxygen electrodes are sufficiently isolated from the ambient air by the water vapor such that the cells have long "shelf life" without sealing the passageways with a mechanical door. The passageways may be referred to as "isolating passageways" or "diffusion limiting passageways" due to their isolating capabilities.

Referring in detail to the isolating passageways described above, these isolating passageways are preferably constructed and arranged to allow a sufficient amount of airflow therethrough while the air moving device is operating so that a sufficient output current, typically at least 50 ma, and preferably at least 130 ma can be obtained from the metal-air cells. In addition, the isolating passageways are preferably constructed to limit the airflow and diffusion therethrough such that the drain current that the metal-air cells are capable of providing to a load while the air moving device is not forcing airflow through the isolating passageways is less than 1 ma per square cm of oxygen electrode surface. Thus, the drain current may be limited to an amount that is smaller than the output current by a factor of at least about 50. In addition, the isolating passageways are preferably constructed to provide an "isolation ratio" of more than 50 to 1.

The "isolation ratio" is the ratio of the rate of water loss or gain by a cell while its oxygen electrodes are fully exposed to the ambient air, as compared to the rate of the water loss or gain of the cell while its oxygen electrodes are isolated from the ambient air, except through one or more limited openings. For example, given identical metal-air cells having electrolyte solutions of approximately thirty-five percent (35%) KOH in water, an internal relative humidity of approximately fifty percent (50%), the ambient air having a relative humidity of approximately ten percent (10%), and no fan-forced circulation, the water loss from a cell having an oxygen electrode fully exposed to the ambient air should be more than 100 times greater than the water loss from a cell having an oxygen electrode that is isolated from the ambient air, except through one or more isolating passageways of the type described above. In this example, an isolation ratio of more than 100 to 1 should be obtained.

More specifically, each of the isolating passageways preferably has a width that is generally perpendicular to the direction of flow therethrough, and a length that is generally parallel to the direction of flow therethrough. The length and the width are selected to substantially eliminate airflow and diffusion through the isolating passageways while the air moving device is not forcing airflow through the isolating passageways. The length is greater than the width, and more preferably the length is greater than about twice the width. The use of larger ratios between length and width are preferred. Depending upon the nature of the metal-air cells, the ratio can be more than 200 to 1. However, the preferred ratio of length to width is about 10 to 1.

The isolating passageways could form only a portion of the path air must take between the ambient environment and the oxygen electrodes. Each of the isolating passageways may be defined through the thickness of the battery housing or cell case, but preferably they are in the form of tubes as described above. In either case, the isolating passageways may be cylindrical, and for some applications each can have a length of about 0.3 to 2.5 inches (about 0.7 to 6.4 cm) or longer, with about 0.88 to 1.0 inches (about 2.24 to 2.54 cm) preferred, and an inside diameter of about 0.03 to 0.3 inches (about 0.07 to 0.7 cm), with about 0.09 to 0.19 inches (about 0.23 to 0.48 cm) preferred. The total open area of each isolating passageway for such applications, measured perpendicular to the direction of flow therethrough, is therefore about 0.0007 to 0.5 square inches (about 0.0045 to 3.23 sq. cm). In other applications, the isolating passageways each can have a length of about 0.1 to 0.3 inches (about 0.25 to 0.76 cm) or longer, with about 0.1 to 0.2 inches (about 0.25 to 0.5 cm) preferred, and an inside diameter of about 0.01 to 0.05 inches (about 0.025 to 0.013 cm), with about 0.15 inches (about 0.38 cm) preferred. The preferred dimensions for a particular application will be related to the geometry of the passageways and the cathode plenums, the particular air mover utilized, and the volume of air needed to operate the cells as a desired level.

The isolating passageways are not necessarily cylindrical, as any cross-sectional shape that provides the desired isolation is suitable. The isolating passageways need not be uniform along their length, so long as at least a portion of each isolating passageway is operative to provided the desired isolation. Further, the isolating passageways may be straight or curved along their length.

Other exemplary isolating passageways and systems are disclosed in U.S. Pat. No. 5,691,074 and U.S. application Ser. No. 08/556,613, and the entire disclosure of each of those documents is incorporated herein by reference.

Metal-air cells without air managers have found limited commercial use in devices, such as hearing aids, which require a low level of power. In these cells, the air openings which admit air to the oxygen electrode are so small that the cells can operate for some time without flooding or drying out as a result of the typical difference between the outside relative humidity and the water vapor pressure within the cell. However, the power output of such cells is too low to operate devices such as camcorders, cellular phones, or laptop computers. Enlarging the air openings of a typical "button cell" would lead to premature failure as a result of flooding or drying out.

Metal-air cells without an air mover must rely on passive airflow to provide oxygen to the air electrode. However, the passive airflow is not sufficient to power many electrical devices. Also, in known metal-air batteries, the direction of any passive airflow will be dependent upon the orientation of the metal-air cell because hotter air naturally rises while cooler air falls. Thus, creating convective airflow is more easily accomplished when the metal-air cell is only intended for use in a single orientation. There is a need for an orientation independent system and method for facilitating convective airflow in a controlled manner over the air electrodes of a metal-air battery at rates sufficient to power electronic, without a mechanical air mover. There is a further need for a system and method of combining air manager technology with cylindrical metal-air cells in an orientation independent manner.

BRIEF SUMMARY OF THE INVENTION

The present invention alleviates or solves the above-described problems in the prior art by facilitating convective airflow through an orientation independent metal-air power source. The present invention seeks to provide a convective air manager for a metal-air battery that is capable of creating a "chimney-effect" within the metal-air battery. Enhanced convective airflow through the metal-air battery eliminates the need for utilizing a mechanical air mover in an air manager.

Generally described, the present invention provides a housing for enclosing at least one metal-air cell. A path of convective airflow passes through the housing. The path communicates with the exterior of the housing during discharge of the metal-air battery and at least a portion of the path has a significant vertical component in every orientation of the metal-air battery. At least a portion of the path is heated during discharge of the metal-air cell.

In accordance with one embodiment of the invention, a housing encloses at least one metal-air cell. The housing includes an air cavity at each end with a central air passageway therebetween. Each cavity includes one or more resistance elements which selectively heat the air within each cavity. A temperature differential is created between the heated air and the cooler air elsewhere in the housing which causes convective airflow between the cavities through the central passageway. A plurality of isolating passageways are provided which extend through the walls of the housing to the cavities for inlet and outlet airflow.

In accordance with another embodiment of the invention in a cylindrical cell, the central passageway is prismatic and is defined between a pair of planar oxygen electrodes. The cavities are disk-shaped and have a radius larger than a width of the central passageway between the pair of oxygen electrodes. Alternatively, the central passageway may be cylindrical and defined by a coaxial cylindrical oxygen electrode. In such case, the cavities would have a larger outer periphery than an outer periphery of the cylindrical central passageway. In either case, the resistance elements are preferably positioned in the outer periphery of each cavity, and may be arcuate.

In accordance with another aspect of the present invention, a centrally located gravity switch is provided in the housing of the metal-air battery. The switch includes a plurality of contact pairs which are coupled to the resistance elements. Each contact pair is associated with a particular orientation of the metal-air battery and a particular resistance element to be heated when the battery is in that orientation. A conductive ball is also provided for completing the circuit between a contact pair to allow at least a portion of one of the resistance elements to be heated.

Alternatively, these objects are accomplished in a prismatic metal-air power source having a substantially L-shaped air plenum defined by the interior surfaces of the housing and the enclosed metal-air cell. A plurality of isolating passageways connect the air plenum without outside air. The isolating passageways are oriented in a manner that facilitates convective airflow through the housing and across the oxygen electrode of said metal-air cell Heating may be applied selectively to areas of the plenum to drive the convective flow.

In any of the foregoing embodiments, the one option for providing heat to enhance convective air flow is to heat the isolating passageways to create a chimney effect within the heated isolating passageway.

Accordingly, an object of this invention is to provide a ventilation system for metal-air batteries that overcomes the aforementioned inadequacies of prior art ventilation systems.

Still another object of the present invention is to provide a structurally simple and economical power source utilizing convective airflow that functions independent of its orientation.

Yet another object of the present invention is to provide a ventilation system for a metal-air power source wherein the operation of the power source is transparent to the user. That is, in order to operate the ventilation system of the present invention, no action on part of the user is required.

The foregoing has broadly outlined some of the more significant objects and features of the present invention. These should be construed to be merely illustrative of some of the more prominent features and applications of the intended invention. Many other beneficial results can be obtained by applying the disclosed invention in a different manner or by modifying the disclosed embodiments. Accordingly, other objects and a more comprehensive understanding of the invention may be obtained by referring to the detailed description of the preferred embodiment taken in conjunction with the accompanying drawings, in addition to the scope of the invention defined by the claims.

BRIEF DESCRIPTION OF THE DRAWINGS

FIG. 2B is a cross sectional view an alternative embodiment taken along line 2—2 of FIG. 1A.

FIGS. 3A and 3B are alternative cross-sectional views taken along line 3—3 of FIG. 1A.

FIGS. 4A and 4B are alternative embodiments of a gravity switch of the present invention.

FIG. 5 is a top view of one embodiment of a prismatic metal-air power source of the present invention, with a top housing panel removed to show detail.

FIG. 6A is a side cross-sectional view of the power source taken along line 6A—6A of FIG. 5.

FIG. 6B is a side view of the power source shown in FIG. 6A sitting on end in a vertical position.

FIG. 6C is a side view of the power source shown in FIG. 6A lying on its top panel.

DETAILED DESCRIPTION

Figure 1A:
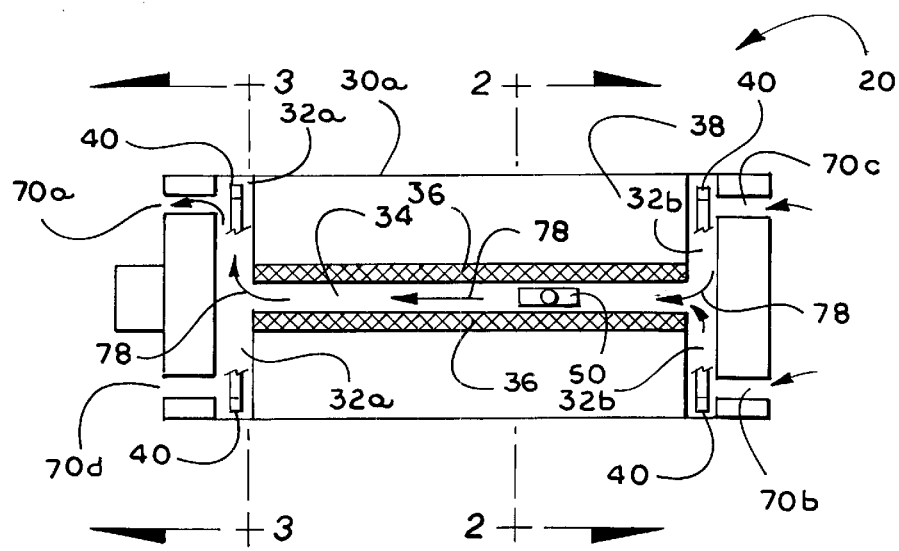
FIG. 1A is a side sectional view of one embodiment of a cylindrical metal-air power source of the present invention.

With reference to the drawings, in which reference characters refer to similar parts throughout the several views, new and improved metal-air power sources embodying the principles and concepts of the present invention and generally designated by the reference numbers 20 and 22 will be described. The present invention provides orientation independent metal-air power sources 20, 22 which incorporate air manager technology without the aid of a mechanical air mover. Air is circulated through the metal-air cells by convective airflow rather than by an air mover.

As described above, the small size and configuration of cylindrical batteries makes it difficult to effectively incorporate air movers within or in close proximity to the battery housing. Convective airflow, the transfer of heat by the circulation flow of air due to temperature differences, presents an alternative to the use of a mechanical air mover as a component in the air manager. The regions of higher temperature, being less dense, rise, while the regions of lower temperature move down to take their place. However, because cylindrical batteries lend themselves to being installed in various orientations, creating convective airflow along a horizontal path between two ends of a metal-air cell presented a problem.

Figure 1B:
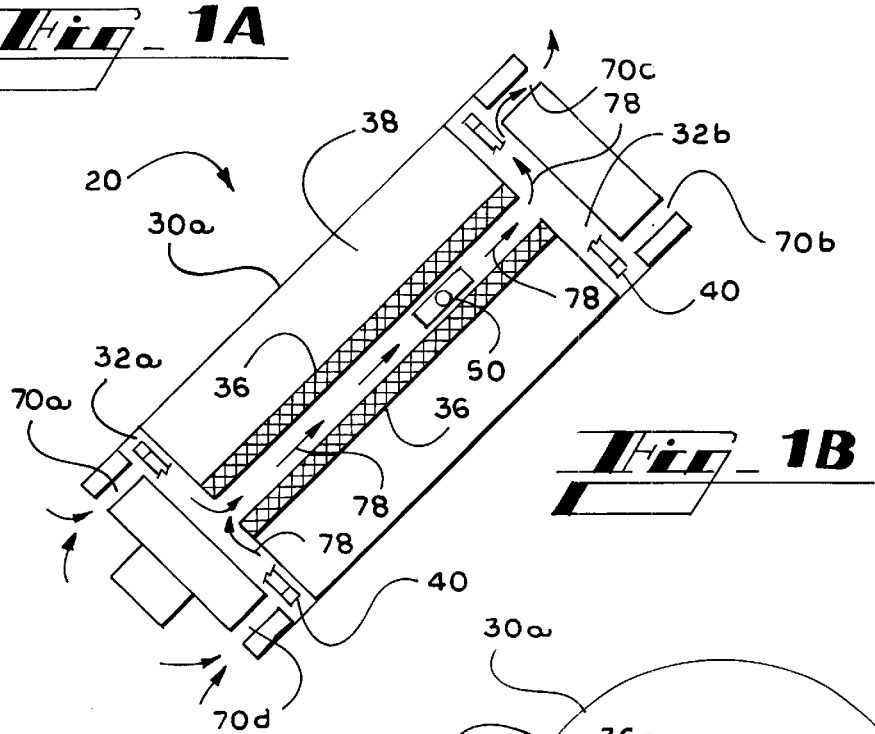
FIG. 1B is a side sectional view of the power source shown in FIG. 1A rotated counterclockwise approximately 60 degrees.

The power sources 20, 22 are internally configured for facilitating upward airflow in a metal-air battery housing. FIGS. 1A and 1B illustrate one embodiment of the metal-air battery 20 having a cylindrical housing 30a. In FIG. 1B, the battery 20 is rotated counterclockwise approximately 60 degrees about a radius of the cylinder. The housing 30a is preferably shaped in a manner similar to that of standard "AA", "D" or similarly configured batteries. At each opposing end of the housing 30a is an air cavity 32a,32b. The air cavities 32a,32b are preferably substantially disk-shaped and extend substantially the full radial cross-section of the housing 30a. A central air passageway 34 extends substantially the entire length of the housing 30a between the cavities 32a,32b. The central passageway 34 communicates with each cavity 32a,32b. Airflow proceeds from one of the cavities 32a or 32b into the central passageway 34 in substantially an L-shaped manner, and then proceeds out of the central passageway 34 and into the other cavity 32b or 32a, respectively, in substantially the same L-shaped manner.

Figure 2A:
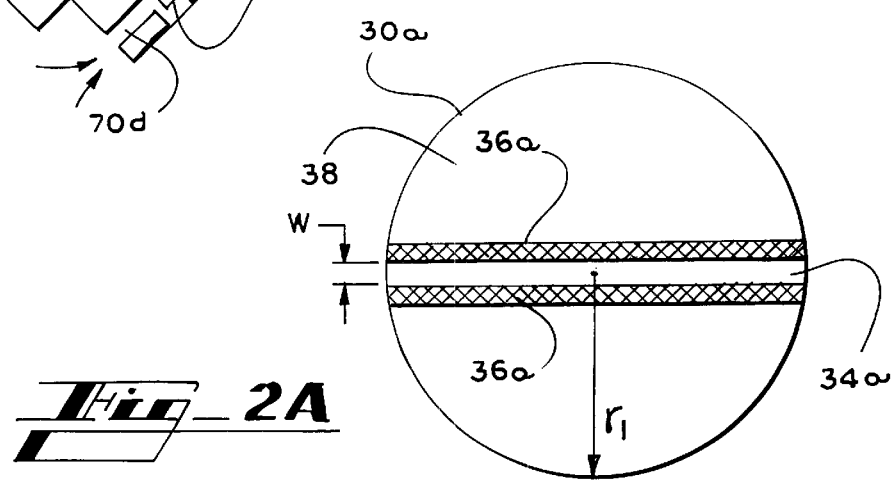
FIG. 2A is a cross sectional view taken along line 2—2 of FIG. 1A

Also, within the housing 30a is at least one oxygen electrode 36 and a metallic anode 38. The length of the central passageway 34 is adjacent the oxygen electrode 36. For example, as shown in FIG. 2A, a pair of planar oxygen electrodes 36a are oriented to face one another across a generally prismatic central passageway 34a. When utilizing a prismatic central passageway 34a, the cavities 32a,32b each have a radius $r_1$ larger than a width w between the pair of planar oxygen electrodes 36a. Alternatively, as shown in FIG. 2B, the central passageway 34b is cylindrical and defined by a coaxial cylindrical oxygen electrode 36b. The periphery $p_1$ of the cavities 32a,32b should be larger than the periphery $p_2$ of the cylindrical central passageway 34b. In other words, the radius $r_2$ of the cavities 32a,32b is larger than the radius $r_3$ of the cylindrical central passageway 34b.

As best shown in FIGS. 3A and 3B, each cavity 32a,32b includes a resistance element 40. Preferably, the resistance elements 40 are ring-shaped coils. The resistance element 40 shown in FIG. 3A is a complete circle. In FIG. 3B, however, the resistance element 40 consists of four separate arcuate portions 40' defining a complete circle. Although circular and semi-circular resistance elements are shown, resistance elements made up of any number of portions and shapes could equivalently be used. Preferably, the resistance elements 40 are each positioned in the outer periphery of their respective cavity 32a,32b as shown in FIGS. 3A and 3B.

The resistance elements 40 are powered by the metal-air cells of the battery and are connected in a circuit (not shown) with cathode and anode terminals (not shown) of the battery. Also, a switch (not shown) allows current to flow to the resistance elements only when power is being drawn from the battery. An optional controller (not shown) may be utilized to pulse convective flow and minimize the battery power used for ventilation. Pulsed air manager operation is discussed in U.S. Pat. No. 5,721,064 and U.S. patent application Ser. Nos. 08/936,206 and 09/275,855, which are incorporated herein by reference.

When powered, the resistance elements 40 operate to heat the air within each cavity 32a,32b. By heating at least a portion of one of the resistance elements 40, a temperature differential is created between the heated air in one of the cavities 32a,32b and the unheated air in the central passageway 34. The temperature differential facilitates airflow through the housing 30a and across the oxygen electrode 36 of the metal-air battery 20. The resistance elements 40 at either end of the battery 20 may be heated selectively to cause the convective airflow.

The present invention further comprises a controller such as a gravity switch 50a, 50b, shown in FIGS. 4A and 4B, which is responsive to the orientation of the metal-air battery 20. FIG. 4B is an alternative embodiment of the switch shown in FIG. 4A. The gravity switch 50a, 50b is preferably centrally located in the battery housing 30. However, the gravity switch 50a, 50b may be located elsewhere inside or outside the battery housing 30 so long as the switch 50a, 50b is responsive to the orientation of the metal-air battery. The switch 50a, 50b is electrically connected to the resistance elements 40 or 40' and the battery. Each switch 50a, 50b includes a conductive ball 52 and a plurality of contact pairs 54. There is a shallow "V" 55 between each contact of a contact pair 54 for receiving the ball 52.

The switch 50a shown in FIG. 4A has a cylindrical chamber 56 with a pair of contacts 54 at each end. The cylindrical chamber 56 preferably has a constant circular cross section. The ball 52 is free to roll within the switch 50a between the two contact pairs 54. Once the ball 52 connects either one of the contact pairs 54 at one end of the switch 50a, at least a portion of one of the resistance elements 40 is heated. The air surrounding the heated resistance element 40 is heated and a temperature differential is created as described above.

The switch 50b shown in FIG. 4B has a prolate spheroid chamber 60 for receiving the ball 52. In contrast to the switch 50a of FIG. 4A, the switch 50b of FIG. 4B has contact pairs 54 positioned along the sides of the chamber 60, approximately midway, as well as at each end. The switch 50b may be configured to have any number of contact pairs 54. Although a cylindrical chamber and a prolate spheroid chamber are shown, switch chambers of any appropriate shape may be equivalently used. In either embodiment, the contacts 54 are connected to leads 62 which are, in turn, connected to the resistance elements 40 and the enclosed metal-air cell. Each separate portion of the resistance elements is separately wired.

Each contact pair 54 of a switch 50a, 50b is associated with a particular angular orientation of the metal-air battery 20. For example, when one end of a switch is lower than any other portion of the switch 50a, 50b, causing the ball 52 to contact the contact pair at the lower end, the circuit is completed and at least a portion of one of the resistance elements 40 is heated as described above. Preferably, whichever portion of the resistance elements 40 is higher than all other remaining portions of the resistance elements 40 is heated. Alternatively, the lowest resistance element may be heated to create a similar flow.

The ends of the metal-air battery 20 include a plurality of isolating passageways 70a–70d through the housing 30a to their respective cavity 32a,32b as best shown in FIGS. 1A and 1B. The isolating passageways 70a–70d are diffusion tubes which restrict passage of air into the metal-air cells as described in U.S. Pat. No. 5,691,074. Depending on the orientation of the battery, the portion of isolating passageways, for example, 70c and 70b, at one end are inlets and the remaining portion of isolating passageways 70a and 70d at the other end are outlets. The isolating passageways 70a–70d are preferably adjacent the outer periphery of the cavities 32a,32b and extend through their respective end of the housing 30a. In one embodiment utilizing a circular central passageway 34b, the isolating passageways 70a–70d may be radially displaced from the central passageway 34 as shown in FIGS. 1A and 1B. In such case, the isolating passageways 70a–70d are in parallel misalignment with the central passageway 34a. However, the isolating passageways may be arranged differently so long as a sufficient amount of airflow is permitted therethrough while the temperature differential exists.

A path of convective airflow, generally shown by arrows 78 in FIGS. 1A and 1B, is created in the metal-air battery 20 during discharge of the metal-air cell by heating a selected resistance element 40 (or portion 40'). The path 78 communicates with the exterior of the housing at two ends of the path 78. Because hotter air rises, at least some portion of the path 78 should have a significant vertical component in every orientation of the metal-air battery 20. With the battery on its side as shown in FIG. 1A, when the high portion of a cavity 32a is heated, the heated air rises through one or more adjacent isolating passageways 70a and exits the battery. The path 78 of convective airflow begins in inlet isolating passageways 70b and 70c, as ambient air is drawn into the unheated cavity 32b. Then, the path 78 continues through the central passageway 34 and into the heated cavity 32a. Next, the path continues upward towards the highest isolating passageways 70a. The heated portion 40' of a resistance element 40 (preferably either the highest or the lowest arcuate portion 40') is selected to define the path 78. The air in the central passageway 34 is drawn upward as the heated air escapes through the passageways 70a. The path 78 of convective airflow terminates after exiting the outlet isolating passageways 70a and passes into the exterior environment surrounding the metal-air battery 20. If the lower cavity 32b is heated, the same path of flow is created as the heated air rises through the central passageway 34.

On the other hand, when the metal-air battery 20 is upright, the central passageway 34 itself would be a vertical portion of the path facilitating the "chimney effect" through the housing 30 of the metal-air battery 20. The path 78 redirects itself in response to sufficiently altering the orientation of the metal-air battery during discharge of the metal-air battery. For example, the change in orientation of the battery causes the ball 52 of the switch 50b to move from one set of contacts 62 to another set of contacts 62, so that an alternate portion 40' of one of the resistance elements 40 is heated to define the path 78. As shown in FIG. 1B, the battery 20 is nearly turned on end, but the path of the convective airflow continues to proceed from the lowest end to the highest end of the battery. In this orientation, the passageways 70a and 70d serve as inlets, and the passageways 70b and 70c serve as outlets.

FIGS. 5 and 6A are top and side views of a prismatic metal-air battery 22 configured for facilitating convective airflow therethrough. The metal-air battery 22 has a housing 30b for enclosing at least one metal-air cell 80. The housing 30b is defined by a top 82, a bottom 84, two sides 86, and two ends 88. A plurality of isolating passages 90 extend into the interior of the housing 30b. The isolating passageways 90 at least partially define a communication path between the exterior and the interior of the housing 30b. The isolating passageways 90 are tubes oriented in the housing 30b for (i) permitting ambient airflow into the interior of the housing 30b, (ii) permitting convective airflow to rise through at least a portion of the housing 30b and move along a path across an oxygen electrode 81 of each metal-air cell 80, and (iii) permitting convective airflow to escape to the exterior of the housing 30b after being depleted of oxygen.

In one embodiment, the metal-air cells are positioned against the top 82 and against one end 88 as best shown in FIG. 6A. They are held in this position by adhesive or by a shelf (not shown). A substantially L-shaped air plenum is defined between the interior surface of the housing 30b and the metal-air cells 80 within the housing 30b. The L-shaped air plenum has a first air chamber 92 along the length of the housing 30b and a second air chamber 94 along the height of the housing 30b. The first and second air chambers are substantially perpendicular to one another as shown in FIGS. 6A–C.

Figure 7A:
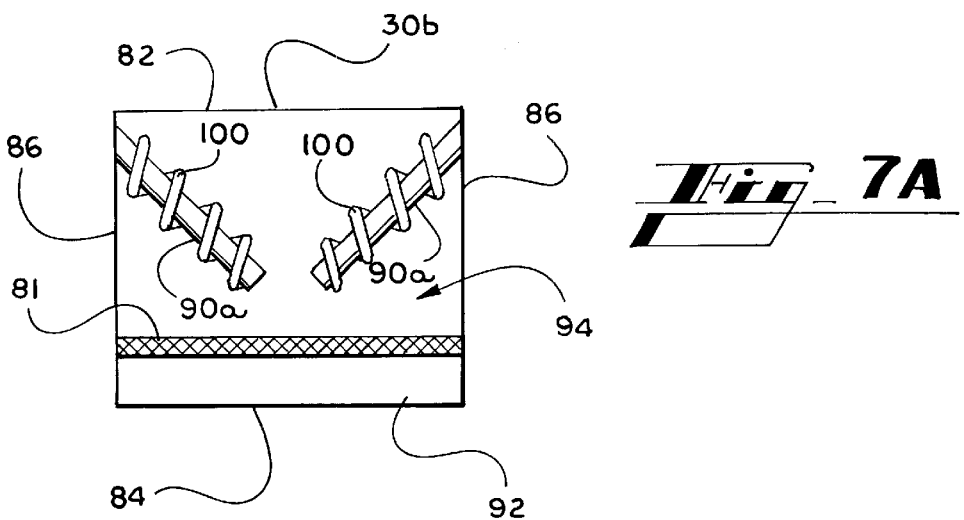
FIG. 7A is a cross-sectional view taken along line 7A—7A of FIG. 5.

As best shown in FIGS. 5 and 7A, at least one isolating passageway 90a extends into the chamber 94 from near the top of one side 86 in an angular manner relative to the top 82, bottom 84 and sides 86 in a plane substantially parallel to at least one of the ends 88. Another isolating passageway 90b extends into the chamber 92 from near the opposite bottom corner of the other side 86 in an angular manner relative to the ends 88 and sides 86 in a plane substantially parallel to the top 82 and bottom 84. Preferably, a pair of isolating passageways 90a which oppose one another extend downward into the chamber 94 of the housing 30b from the sides 86 and a second pair of isolating passageways 90b which also oppose one another extend parallel to the bottom 84 into the chamber 92 of the housing 30b from the sides 86. In such case, the two pairs of opposing isolating passageways 90a, 90b are substantially perpendicular to each other.

Figure 7B:
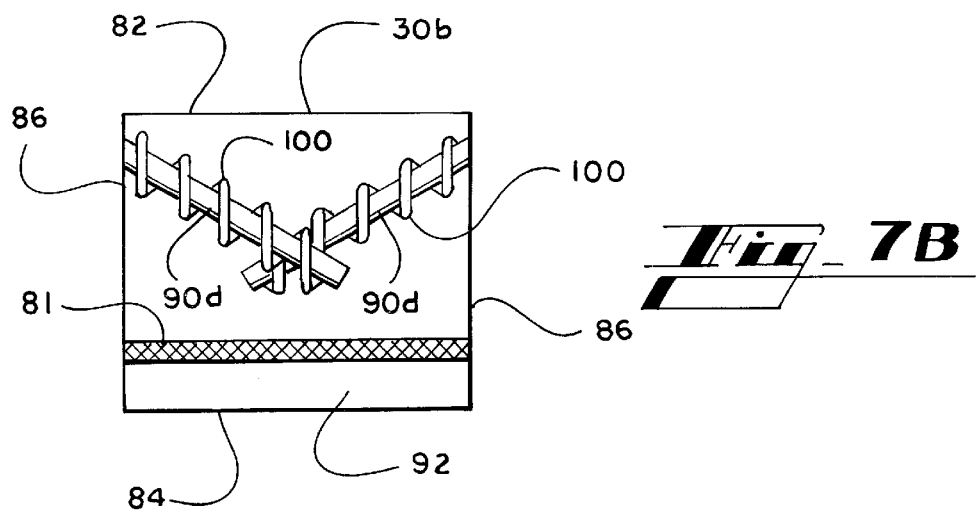
FIGS. 7B and 7C show alternative embodiments of isolating passageway configurations.
Figure 7C:
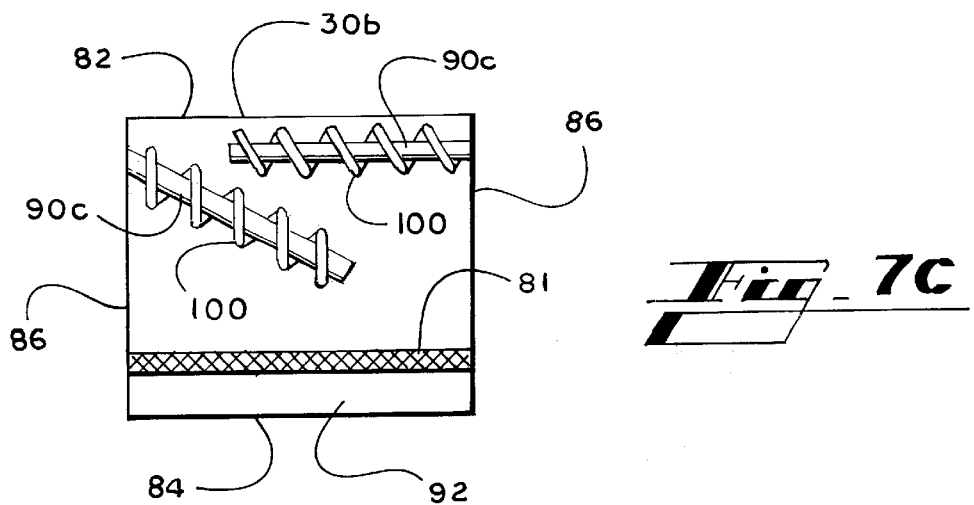

FIGS. 7A–C illustrate various orientations of the isolating passageways 90 relative to each other which will produce the "chimney effect" while drawing air from or delivering air to different parts of the chamber 94. In FIGS. 7A–C, one pair of the isolating passageways are adjacent to one of the ends 88 within the chamber 94 of the housing 30b. FIG. 7A is an end view taken along line 7A—7A of FIG. 5. Preferably, each pair of isolating passageways 90a oppose one another as best shown in FIGS. 7A–7C. In FIG. 7A, the isolating passageways 90a converge towards one another in a plane substantially parallel to one of the ends 88. The isolating passageways 90a shown in FIG. 7B oppose one another and overlap. In FIG. 7C, the isolating passageways 90d also oppose one another and are angularly misaligned. The isolating passageways 90b extending along the bottom 84 may also be oriented in a manner similar to that shown in FIGS. 7A–7C.

The metal-air battery 22 further includes resistance elements 100 which are powered by the metal-air battery itself. Each resistance element 100 preferably encompasses an isolating passageway 90. As shown in FIGS. 5, 6A, 6B and 7A–C, the resistance elements 100 are spiral resistance elements wound around the isolating passageways 90. When heated, each passageway acts like a chimney, with a flow of hot air rising through it.

A central gravity switch 102, shown in FIGS. 6A–6C, is positioned at the juncture plenum between the first and second chambers 92, 94. The switch 102 is connected to the resistance elements 100. The gravity switch 102 operates in a manner similar to the switch 50 described above.

In FIG. 6A, the battery 22 is in a horizontal position. In the horizontal position, convective airflow proceeds along a path shown by the arrows 110. As shown in FIG. 6A, the path 110 passes through the air plenum chamber 92 along the bottom 84 underneath the metal-air cathodes 81 and upward along the end 88 of the housing 30b. In other words, the convective airflow in the first chamber 92 passes underneath the metal-air cells 80. In the second chamber 94, the convective airflow passes upward between the metal-air cell and the end 88.

However, when the metal-air battery 22 is vertically oriented as shown in FIG. 6B, the path 1 10a changes direction. One of the resistance elements 100 is heated and the air begins to rise upward. The resistance elements at either end of the battery 22 may be heated to cause the convective airflow. For example, in FIG. 6B, if a resistance element at the bottom were heated, air would still rise through the air plenum. Alternatively, if the upper most resistance element were heated, the heated air at the top of the battery would be passed to the exterior of the battery which would draw the cooler air near the bottom of the battery 22 towards the top of the battery 22. FIG. 6C illustrates the metal-air battery 22 lying on its top 82. In this case a heating element in the chamber 94 may preferably be heated. As shown in FIG. 6C, the path 110 proceeds upwards in the second chamber 94 along the end 88 into the first chamber 92. The convective airflow path 110 then proceeds along the bottom 84 in the first chamber 92 until exiting through the isolating passageways 90.

The method of providing reactant air to the metal-air batteries 20, 22 as described above constitutes an inventive method of the present invention in addition to the metal-air batteries 20, 22 themselves. In practicing the method of ventilating a metal-air battery 20, 22 as described above, the steps include providing a path 78, 110 through a housing 30 that encloses at least one metal-air cell as described above. The method then includes heating at least a portion of the path such that convective airflow rises along at least a portion of the path and through the metal-air battery during discharge of the metal-air battery. In response to the convective airflow passing through the metal-air battery, the convective air flow reacts with the oxygen electrode of the metal-air cell during discharge. Then the method includes the step of passing convective airflow to the exterior of the housing 30 after reacting with the oxygen electrode of the metal-air cell.

The method of the present invention may also include the step of altering the angular orientation of the metal-air battery 20, 22 between or during periods of discharge and, in response, redirecting the path of convective airflow 78, 110 to permit at least a portion of the convective airflow to continue to rise through the metal-air battery in order for airflow to exit to the exterior of the housing 30 during discharge of the metal-air battery.

Alternatively, in practicing the method of ventilating a metal-air battery 20 as described above, the steps include heating at least a portion of a resistance element 40 in an air cavity 32 in a first end of a housing 30a. In response to heating a portion of the resistance element, the method includes the step of creating a temperature differential between the first end and a second end of the housing 30a. And, in response to creating the temperature differential, the method includes receiving ambient airflow through inlet isolating passageways 70 in the housing 30a and into a second air cavity 32 in the second end of the housing 30a, causing airflow through a central passageway 34 communicating between the cavities, and passing heated airflow from the first cavity through outlet isolating passageways 70 in the housing to the exterior environment surrounding the metal-air battery 20.

The alternative method may further comprise the step of heating an alternative portion of either of the resistance elements 40 in place of the previously heated portion in response to altering the angular orientation of the metal-air battery. The method may also include contacting a pair of contacts 54 coupled to the resistance element with a conductive ball 52 to provide current to a portion of the resistance element as described above. Next, the method may include rolling the ball to contact a different pair of contacts to power an alternative portion of the resistance elements in response to altering the angular orientation of the metal-air battery. For example, an alternative portion of the resistance elements is heated responsive to positioning the alternative portion higher than any other portion of either of the resistance elements.

When a battery 20 or 22 embodying the invention is connected to an electrical device and the device is turned on, power is drawn from the battery and the heating elements are activated to draw air over the air electrodes of the battery cells. Preferably, the heating elements are operated intermittently to preserve battery power. As the orientation of the electrical device changes during use, the gravity switch of the air manager automatically selects appropriate heating elements to maintain a convective flow of air most efficiently.

Those skilled in the art will understand that other sources of energy may be used to provide the convective heating described above, particularly heat generated by chemical reactions within the cells. Also, other configurations of heating elements may be provided. This invention is applicable to both primary and secondary cells. A composite air manager could be provided using a convective air manager supplemented by a mechanical air manager to help supply peak loads.

The present invention has been illustrated in great detail by the above specific examples. It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

What is claimed is:

1. A ventilation system for a power supply comprising:
   a housing for enclosing at least one cell having an oxygen electrode, said housing having a pair of opposing ends;
   an air cavity in said housing at each said end;
   a central passageway through said housing extending between and communicating with each said cavity, a length of said central passageway extending adjacent said oxygen electrode; and
   a resistance element in each said cavity, each said resistance element operable to heat air within said respective cavity and create a temperature differential between the heated air in said cavity and unheated air in said central passageway to facilitate convective airflow through said housing and across said oxygen electrode.

2. The ventilation system of claim 1 further comprising a gravity switch centrally located in said housing and coupled to said resistance elements, said switch including a conductive ball and a plurality of contact pairs therein, each said contact pair associated with a particular angular orientation of the housing, and at least a portion of one of said resistance elements being heated when said ball is in contact with one of said contact pairs.

3. The ventilation system of claim 1 wherein whichever said portion of said resistance element is higher than all other remaining portions of said resistance elements is heated.

4. The ventilation system of claim 1 wherein one of said ends includes one or more outlet isolating passageways through said housing from one said cavity and the other of said ends includes one or more inlet isolating passageways through said housing from the other said cavity.

5. The ventilation system of claim 4 wherein said isolating passageways are radially displaced from a longitudinal axis of said central passageway.

6. The ventilation system of claim 1 wherein said cavities are substantially disk-shaped.

7. The ventilation system of claim 1 wherein said central passageway is prismatic and is defined between a pair of planar oxygen electrodes of a pair of said cells.

8. The ventilation system of claim 7 wherein each said cavity has a radius larger than a width of said central passageway between said pair of oxygen electrodes.

9. The ventilation system of claim 1 wherein said central passageway is cylindrical and is defined by a coaxial cylindrical oxygen electrode.

10. The ventilation system of claim 9 wherein each said cavity has a periphery larger than a periphery of said cylindrical oxygen electrode.

11. The ventilation system of claim 1 wherein said central passageway is cylindrical and said cavities are larger than the central passageway along a direction perpendicular to the length of the central passageway.

12. A ventilation system for a power supply comprising:
    a housing for enclosing at least one electrochemical cell having an air electrode;
    a path of airflow through said housing providing reactant air to said air electrode,
    said path communicating with an exterior of said housing during discharge of said cell,
    at least one electrically powered heater positioned along said path to create a convective airflow along said path; and
    a circuit connected to supply said heater with current from said cell.

13. The ventilation system of claim 12 wherein said path communicates with the exterior of said housing at two ends of said path.

14. The ventilation system of claim 12 wherein said heater comprises a resistance element.

15. The ventilation system of claim 12 wherein said housing is cylindrical.

16. The ventilation system of claim 12 wherein said housing is prismatic.

17. The ventilation system of claim 12 wherein said heater comprises a resistance element, and further comprising a controller responsive to the orientation of the housing, at least a portion of said resistance element being positioned in said path, and wherein said controller directs current from said cell to said resistance element.

18. The ventilation system of claim 12 further comprising a plurality of isolating passageways at least partially communicating with said path and the exterior of said housing, a portion of said plurality of isolating passageways permitting ambient airflow therethrough to said cell during discharge of the cell, the remaining portion of said plurality of isolating passageways permitting convective airflow therethrough to the exterior of said housing during discharge of the cell, and said plurality of isolating passageways restricting ambient airflow therethrough to said cell when the cell is not being discharged.

19. The ventilation system of claim 12 wherein airflow along said path during discharge of said cell is redirectable in response to altering the orientation of the housing.

20. A method for ventilating a metal-air battery, comprising the steps of:
   providing a path through a housing for enclosing at least one metal-air cell;
   heating at least a portion of said path such that convective airflow rises along at least a portion of said path and through the metal-air battery during discharge of the metal-air battery;
   in response to said convective airflow passing through the metal-air battery, said convective airflow reacting with an oxygen electrode of said metal-air cell during discharge of the metal-air battery;
   passing said convective airflow to an exterior of said housing after reacting with said oxygen electrode of said metal-air cell;
   altering an angular orientation of the metal-air battery during discharge of the metal-air battery; and,
   in response to said orientation altering step, redirecting said path of convective airflow to permit at least a portion of said airflow to continue to rise through the metal-air battery in order for the airflow to exit to the exterior of said housing during discharge of the metal-air battery.

21. A method for ventilating a power supply including a cell having an oxygen electrode in an orientation independent manner, comprising:
   heating at least a portion of an electrical resistance element positioned in a first air cavity in a first end of a housing for enclosing at least one cell by directing current from said cell to said resistance element;
   in response to heating said portion of said resistance element, creating a temperature differential between said first end and a second end of said housing; and
   in response to creating said temperature differential, receiving ambient airflow through inlet isolating passageways in said housing and into a second cavity in said second end of said housing, causing airflow through a central air passageway communicating between said cavities, and passing heated airflow from said first cavity through outlet isolating passageways in said housing to an exterior environment surrounding the power supply.

22. The method of claim 21 further comprising the step of heating an unheated portion of said resistance element in place of said previously heated portion in response to altering an angular orientation of the housing.

23. The method of claim 22 further comprising the step of contacting a contact pair coupled to said resistance element with a conductive ball to heat said portion of said resistance element.

24. The method of claim 23 further comprising the step of rolling said ball to contact a different contact pair to power said unheated portion of said resistance element in response to altering the angular orientation of the housing.

25. The method of claim 24 wherein said unheated portion is heated as a result of positioning said unheated portion higher than any other portion of said resistance element.

26. A ventilation system for a metal-air battery comprising:
   a housing for enclosing at least one metal-air cell, said housing defined by two sides, two ends, and a top and a bottom, and said metal-air cell positioned in said housing to define a substantially L-shaped air plenum between said housing and said metal-air cell, said L-shaped plenum defining a first chamber along a length of said housing and a second chamber along a height of said housing, said first chamber and said second chamber being substantially perpendicular to one another;
   at least one resistance element in said housing for generating convective airflow through said housing;
   a circuit connected to supply said resistance element with current from said cell; and
   a plurality of isolating passageways extending into said L-shaped plenum, each said isolating passageway at least partially defining an airflow path between an interior and an exterior of said housing, said isolating passageways oriented in said L-shaped plenum for permitting ambient airflow into the interior of said housing, permitting the convective airflow to rise through at least a portion of said housing and across an oxygen electrode of said metal-air cell, and for permitting the convective airflow to escape to the exterior of said housing.

27. The ventilation system of claim 26 wherein at least one of said isolating passageways extends from one of said two sides in an angular manner relative to said top, bottom and said sides and in a plane substantially parallel to at least one of said ends, and wherein another of said passageways extends from the other of said two sides in an angular manner relative to said ends and said sides and in a plane substantially parallel to said top and said bottom.

28. The ventilation system of claim 26 wherein a pair of said isolating passageways oppose one another and converge towards one another in a plane substantially parallel to one of said ends.

29. The ventilation system of claim 26 wherein a pair of said isolating passageways oppose one another and overlap.

30. The ventilation system of claim 26 wherein a pair of said isolating passageways are straight tubes, oppose one another, and are positioned at an angle with respect to one another.

31. The ventilation system of claim 26 wherein a pair of isolating passageways oppose one another and extend downward into an interior of said housing from said sides and a second pair of isolating passageways oppose one another and extend from said sides into the interior of said housing parallel to said bottom, and said first and second pair of opposed isolating passageways substantially perpendicular to each other.

32. The ventilation system of claim 26 further comprising a resistance element coupled to each said isolating passageway.

33. The ventilation system of claim 32 wherein said resistance elements encompass said isolating passageways.

34. The ventilation system of claim 33 wherein said resistance elements are spiral resistance elements wound around said isolating passageways.

35. A ventilation system for a metal-air battery comprising:
   a housing for enclosing at least one metal-air cell having an oxygen electrode, said housing having a pair of opposing ends;
   an air cavity in said housing at each said end;
   a central passageway through said housing extending between and communicating with each said cavity, a length of said central passageway extending adjacent said oxygen electrode;

a resistance heating element in each said cavity, each said resistance heating element operable to heat air within said respective cavity and create a temperature differential between heated air in said cavity and unheated air in said central passageway to facilitate convective airflow through said housing and across said oxygen electrode of the metal-air battery;

at least one of said resistance heating elements being divided into separate portions; and a gravity switch coupled to said one resistance heating element, said switch being responsive to an angular orientation of the housing to connect one of said portions of said one resistance heating element associated with said angular orientation to a power source.

36. The ventilation system of claim 35 wherein said gravity switch includes a conductive ball and a plurality of contact pairs therein, each said contact pair being associated with a particular angular orientation of the metal-air battery, and being operative to connect one of said portions of said one resistance heating element to said power source when said ball is in contact with one of said contact pairs.

37. A ventilation system for a metal-air battery comprising:

a housing for enclosing at least one metal-air cell having an oxygen electrode, said housing having a pair of opposing ends;

an air cavity in said housing at each said end;

a central passageway through said housing extending between and communicating with each said cavity, a length of said central passageway extending adjacent said oxygen electrode;

a resistance heating element in each said cavity, each said resistance heating element operable to heat air within said respective cavity and create a temperature differential between heated air in said cavity and unheated air in said central passageway to facilitate convective airflow through said housing and across said oxygen electrode of the metal-air battery;

at least one of said resistance heating elements being divided into separate portions; and a switch operative to direct electrical current to one of said portions selected from the group consisting of the highest portion and the lowest portion.

38. A ventilation system for a metal-air battery comprising:

a housing for enclosing at least one metal-air cell; and a path of convective airflow through said housing wherein an air electrode is configured to be positioned, said path communicating with an exterior of said housing during discharge of said metal-air cell, at least a portion of said path having a vertical component;

at least one resistance heating element positioned in said path to heat at least a portion of said path by electrical energy from discharge of said metal-air cell; and a controller responsive to orientation of the metal-air battery, said controller coupled to direct current from said cell to said at least one resistance element.

39. A ventilation system for a power supply comprising:

a housing for enclosing at least one electrochemical cell; and a path of convective airflow through said housing wherein an air electrode is configured to be positioned, said path communicating with an exterior of said housing during discharge of said cell, at least a portion of said path having a vertical component in every orientation of the housing;

at least a portion of said path being heated during discharge of said cell;

said airflow along said path during discharge of said cell being redirectable in response to altering the orientation of the housing.

40. A method for ventilating a power supply in an orientation independent manner, comprising the steps of:

heating at least a portion of a resistance heating element positioned in a first air cavity in a first end of a housing for enclosing at least one electrochemical cell;

in response to heating said portion of said resistance heating element, creating a temperature differential between said first end and a second end of said housing; and in response to creating said temperature differential, receiving ambient airflow through inlet isolating passageways in said housing and into a second cavity in said second end of said housing, causing airflow through a central air passageway communicating between said cavities, and passing heated airflow from said first cavity through outlet isolating passageways in said housing to an exterior environment surrounding the housing;

re-positioning the housing to position an unheated portion of said resistance heating element higher than a heated portion of said resistance heating element; and responsive to said re-positioning, heating at least a part of the unheated portion of said resistance heating element.

41. A ventilation system for a metal-air battery comprising:

a housing for enclosing at least one metal-air cell, said housing defined by two sides, two ends, and a top and a bottom, and said metal-air cell positioned in said housing to define a substantially L-shaped air plenum between said housing and said metal-air cell, said L-shaped plenum defining a first chamber along a length of said housing and a second chamber along a height of said housing, said first chamber and said second chamber being substantially perpendicular to one another;

at least one resistance heating element in said housing positioned to generate convective airflow through said housing;

a circuit connected to supply said resistance element with current from said cell; and a plurality of isolating passageways extending into said L-shaped plenum, each said isolating passageway at least partially defining an airflow path between an interior and an exterior of said housing, said isolating passageways oriented in said L-shaped plenum for permitting ambient airflow into the interior of said housing, permitting the convective airflow to rise through at least a portion of said housing and across an oxygen electrode of said metal-air cell, and for permitting the convective airflow to escape to the exterior of said housing;

a pair of said isolating passageways opposing one another and being angled with respect to one another.

42. A ventilation system for a metal-air battery comprising:

a housing for enclosing at least one metal-air cell, said housing defined by two sides, two ends, and a top and a bottom, and said metal-air cell positioned in said housing to define a substantially L-shaped air plenum between said housing and said metal-air cell, said L-shaped plenum defining a first chamber along a length of said housing and a second chamber along a height of said housing, said first chamber and said second chamber being substantially perpendicular to one another;

a plurality of isolating passageways extending into said L-shaped plenum, each said isolating passageway at least partially defining an airflow path between an interior and an exterior of said housing, said isolating passageways oriented in said L-shaped plenum for permitting ambient airflow into the interior of said housing, permitting the convective airflow to rise through at least a portion of said housing and across an oxygen electrode of said metal-air cell, and for permitting the convective airflow to escape to the exterior of said housing; and a plurality of spiral resistance heating elements wound around said isolating passageways in positions selected to generate convective airflow through said housing.

* * * * *